Oct. 19, 1971  J. R. McCONNELL  3,613,204
OVERALL PROCESSING OF STRUCTURAL MEMBERS
Filed Jan. 20, 1970  4 Sheets-Sheet 1

INVENTOR.
John R. McConnell

Oct. 19, 1971   J. R. McCONNELL   3,613,204
OVERALL PROCESSING OF STRUCTURAL MEMBERS
Filed Jan. 20, 1970   4 Sheets-Sheet 3

INVENTOR.
John R. McConnell

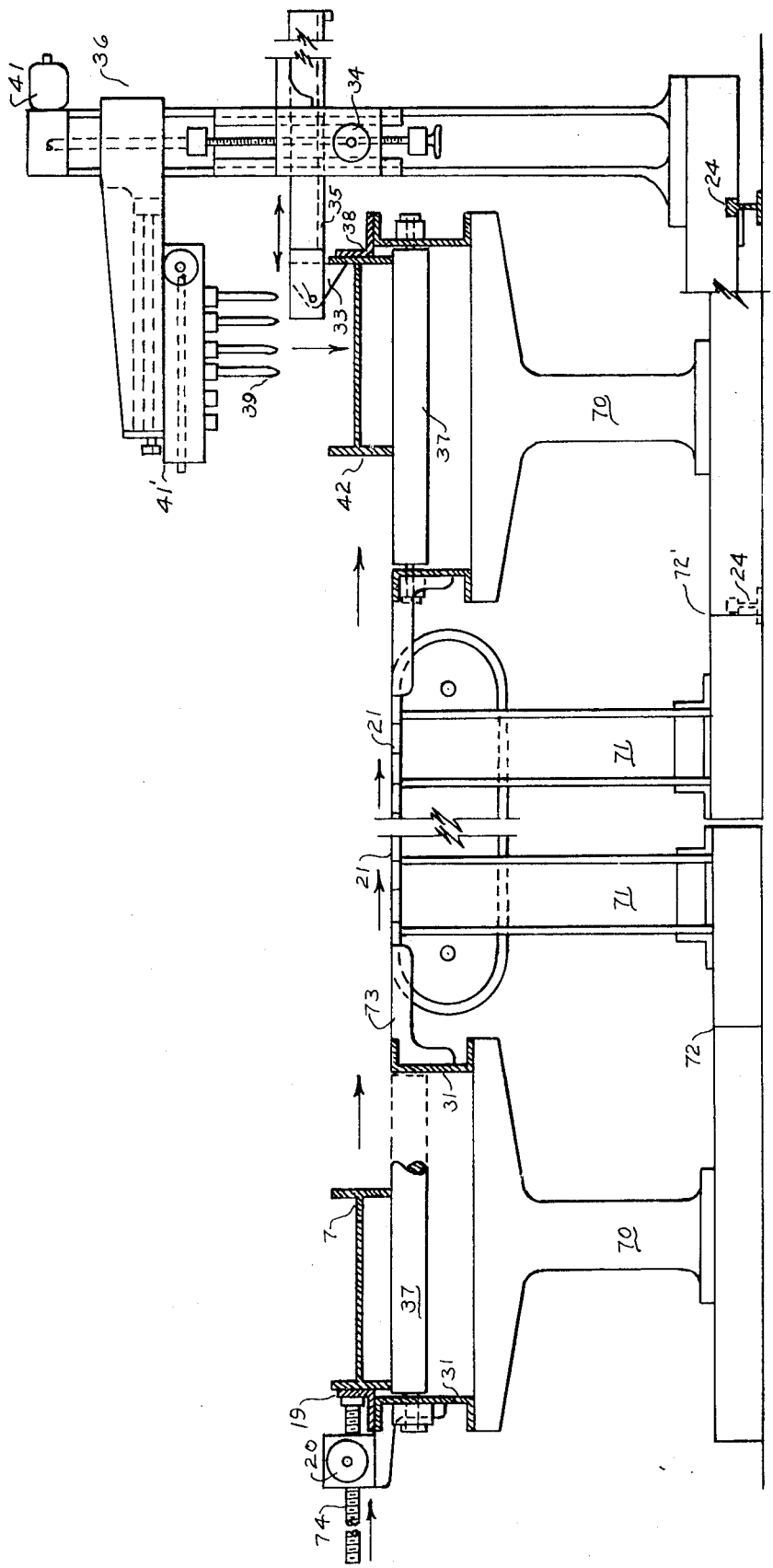

United States Patent Office 3,613,204
Patented Oct. 19, 1971

3,613,204
OVERALL PROCESSING OF STRUCTURAL
MEMBERS
John R. McConnell, 148 Woodside Ave.,
Ridgewood, N.J. 07450
Continuation-in-part of application Ser. No. 737,654, June 17, 1968, now Patent No. 3,546,772. This application Jan. 20, 1970, Ser. No. 4,360
Int. Cl. B23p 17/00, 19/00, 21/00
U.S. Cl. 29—155 R
3 Claims

ABSTRACT OF THE DISCLOSURE

The process comprises the placing of a trailer of raw structural shapes under an overhead crane alongside a longitudinally-arranged apparatus for the coping, cleaning, drilling, attachment of details, bolting and painting of members in a single continuing handling of the work material. It includes hoisting, placement, longitudinal movement and transfer of the shapes to apparatus for transverse movement to pre-located plural fabricating units for simultaneous execution of all required fabricating operations. The completely finished members are then moved longitudinally to a dual longitudinal track for hoisting and placement on an empty outbound trailer for shipment. The mechanized apparatus can automatically and precisely measure, layout and execute any combination of various fabricating operations required for all different types of beams and girders.

---

This invention relates to an overall automated process for the complete production of floor and roof beams and girders in a single continuing, mechanized handling of the material. It is a continuation-in-part of my pending patent application, Ser. No. 737,654, filed June 17, 1968, granted Pat. No. 3,546,772 on Dec. 15, 1970.

The principal objectives are to add to the transverse fabrication of the structural steel shapes, initial longitudinal means of wire-brushing and cleaning of the raw shapes and final longitudinal painting and drying of the finished members. Coping, cutting and welding means are also added.

It is also an objective to mechanically combine and integrate the two means of flow of the heavy work pieces by connected, smooth, facile mechanisms to insure a uniform co-ordinated conveying of the material throughout the complete process.

Another objective is to route the trailers loaded with raw shapes at the rolling mill to the side of the fabricating apparatus for total processing after which the material is loaded into empty trailers for outbound shipment in one co-ordinated operation.

All of the fabricating objectives of the previous related application are retained and combined with the said preparation and finish-painting operations.

For other objectives and a better understanding of the invention reference may be had to the following detailed description taken in conjunction with the accompanying drawing in which:

FIG. 4 is a cross section taken on the left end of Station B of FIG. 1.

FIG. 5 is a cross section taken on the left end of Station E of FIG. 1.

A primary objective of this application is to modernize the handling, routing and mechanical processing of the fabrication of structural steel members, to make steel-framed construction competitively priced in relation to competing types of construction. Although many engineering and technical improvements are incorporated, the reductions in time and cost in a major industry are the outstanding improvements; estimated at 75 and 35% respectively.

Figure 1:
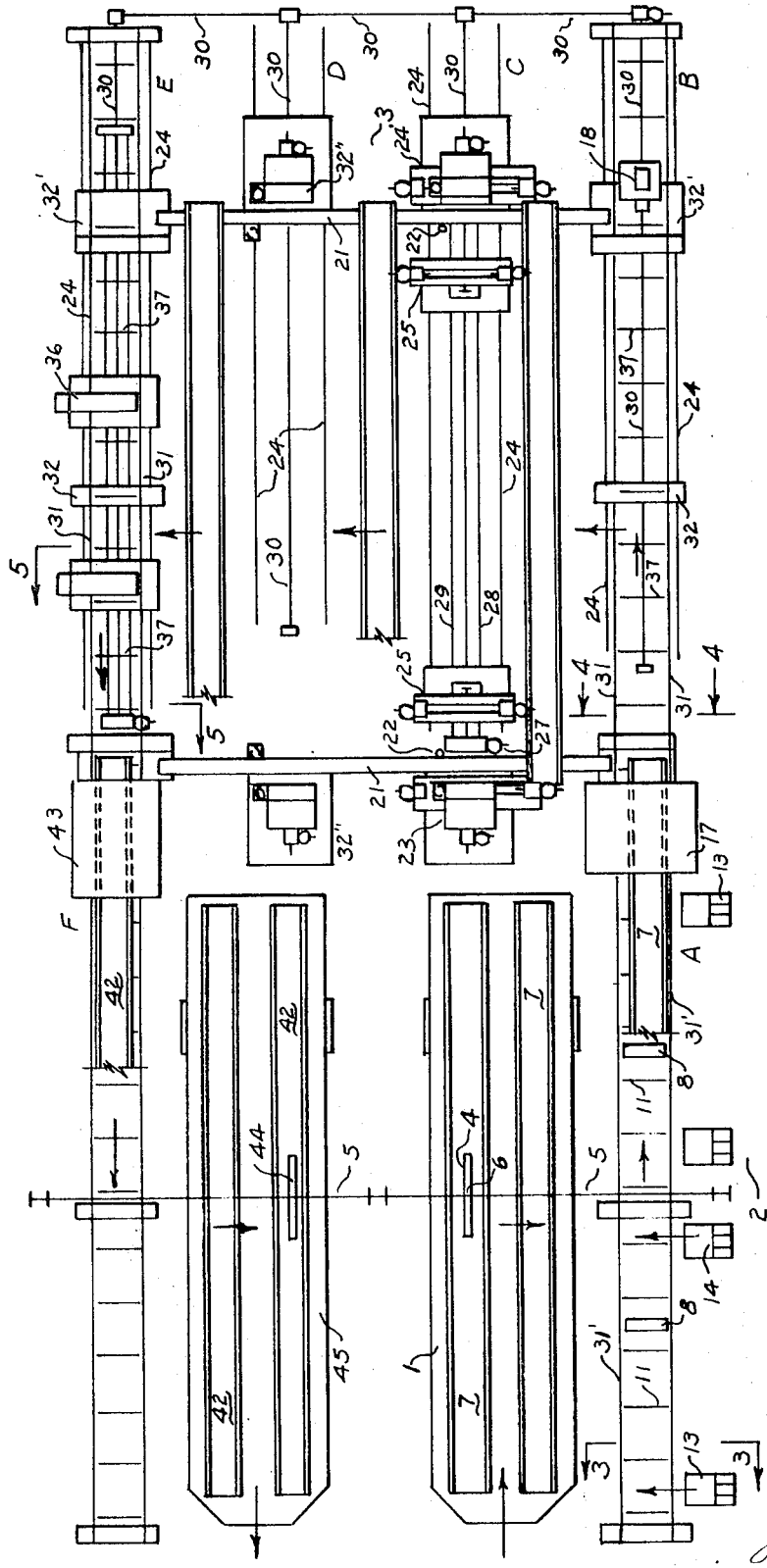
FIG. 1 is a plan-layout of the combined processing apparatus.
Figure 1A:
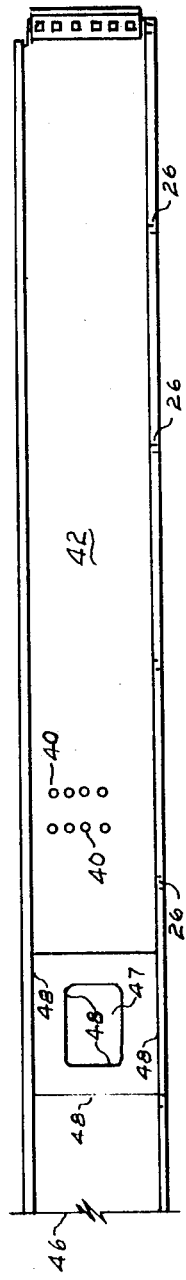
FIG. 1a is an elevation of half the length of a symmetrical finished member.

FIG. 1 shows a trailer 1 load of raw shapes 7, delivered from the steel mill, backed up parallel to an integrated longitudinal 2, and transverse 3 fabricating apparatus having a powered hoist 4, transversely operable on an overhead crane rail 5. Grips or slings on the hoist 6, pick up a shape 7 and lower it onto receiving blocks 8 of station A mounted on vertical compressed air cylinder 9 on small rubber tired trucks 10. The blocks prevent damage due to careless lowering of shapes. They are also used to support the shape above the transverse rollers 11 for the placement of slag protection pans 12 used in burning (flame cutting) and miscellaneous cutting and welding done by mobile trucks 13 and 14, equipped with the necessary automatic equipment 15. At this station necessary coping, cutting, blocking and welding shown in FIG. 1a is done. On swiveling of said pan and cutting and welding nozzles 16, the shape is lowered to the rollers for longitudinal movement through the powered wire brush, flame or equivalent cleaning unit 17, and on to station B where it is brought to a pre-determined cushioned stop by a compressed air gripping device 18.

A guiding fence 19 that is transversely power 20 projected against the shape moves it off the rollers of station B on to the dual transverse conveyor belts 21. The belts move the shape transversely to stops 22 at the operating centres of the end located fixed 23 and rail 24 mounted dual opposed three-way drills 24' at Station C, that are pre-located to suit the working length of the member being fabricated. The mechanism and operation of these units are shown in a co-pending application of this applicant. The mobile intermediate flange drills 25, generally used for holes 26 shown in FIG. 1a in exterior boundary floor members for the attachment of spandrel-masonry framing, are independently moved by powered 27 threaded shafts 28 and 29. All the right-hand mobile end units at all stations are equally moved simultaneously by plural powered shafts 30. The intermediate channel 31 and roller support units 32 are suitable gearing are moved half the distance the mobile end units 32' are moved. The intermediate flange drilling units are also shown in a co-pending application of this applicant, Ser. No. 38,669, filed May 19, 1970.

Conveyed to stops at station D, the dual end units 32" apply preassembled double end connection-angles and bolts, torquing the nuts to a predetermined tension as is set forth in a co-pending application of this applicant, Ser. No. 737.786. filed June 14, 1968.

Arriving at the end of the belts close to Station E, the latches 33 of the powered 34 shape retraction arms 35 mounted on the near-facing sides of the fixed drill-presses 36 hook over the near flange of the shape and pull it onto the transverse rollers 37 and lock it against the fence stop 38 for web drilling. Downward powered 41 movement of the drill-head 41', with two transverse lines of drills 39, drills the holes 40 of FIG. 1a, and actuation of the powered rollers 37 or a powered shape ram 53 moves the completely fabricated member 42 through the combined powered spray painting and lamp-drying tunnel 43. Stopped on station F a second hoist 44 picks up the finished member and deposits it on trailer 45 for outbound delivery to the erection site.

Figure 2:
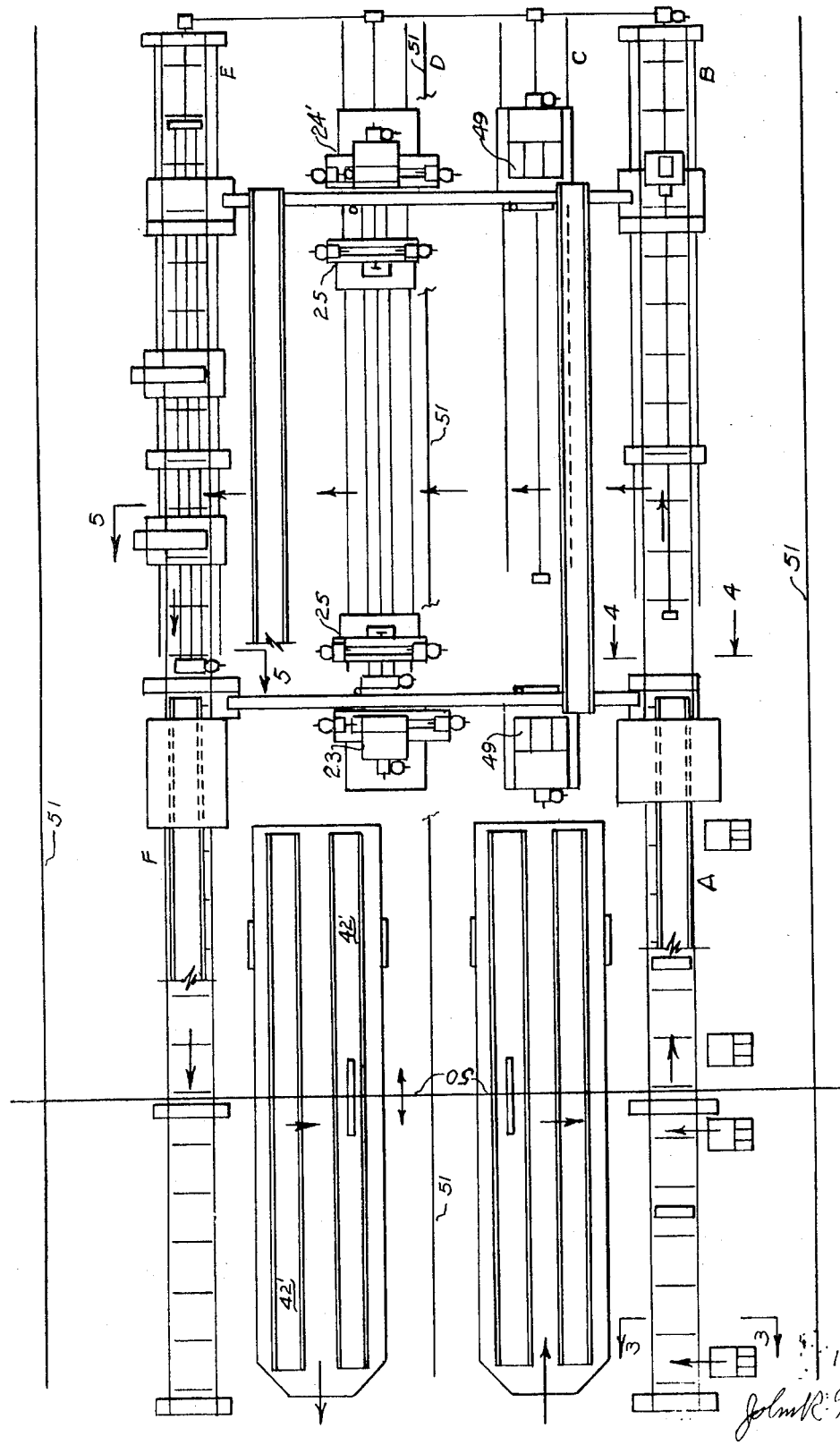
FIG. 2 is a plan-layout of an alternate combined processing apparatus.

It is claimed the above layout can completely prepare any variation of the conventional floor and roof beams and girders that form the great bulk of rectangular-framed steel construction. It would usually use high-strength steel bolts. The substitution of riveting for bolting at station D might be adviseable to conform to the demands of the general run of customer's specifications. A rivet heating-placing-driving unit is shown in a co-pending application of this applicant. Alternately, FIG. 2 shows a slightly different layout that substitutes welding for drilling-bolting and drilling-riveting, and that eliminates the need of coping of the shapes by special extended connection details. Mechanism for this is covered by applicants co-pending applications, Ser. No. 357,580, filed Apr. 6, 1964, now Pat. No. 3,401,254 of Sept. 10, 1968 and application Ser. No. 4,359, filed Jan. 20, 1970.

FIG. 1a shows to a larger scale half of the symmetrically finished member from the mid-length point at 46 to the right end. At 47 is shown a flame-cut hole with welded shear-reinforcing plate 48 executed by unit 14 at station A.

FIG. 2 shows an alternate layout employing fusion welding units 49 at Station C to secure the end connection T or double angle end connections to the web of the shape. The drilling apparatus of station C of FIG. 1 would be located at station D. Except for this and a different overhead crane the layout and operation of the two layouts would be generally similar. Instead of a fixed double gantry crane as in FIG. 1, a transverse travelling crane 50 would be underslung from three fixed runway 51 girders supported by the roof construction. Ordinarily the crane would be located at approximately the line shown in FIG. 1, but it could be moved over the apparatus of stations B to E for erection, repair and servicing of these heavy units and for various other purposes.

This apparatus could as for FIG. 1 prepare, fabricate and finish any of the variety of the usual floor and roof members 42', with certain economies and improvements where fusion welding is allowable. Also resistance welding as shown in a co-epnding application of the applicant Ser. No. 558,301, filed June 17, 196, now Pat. No. 3,522,-408 of Aug. 4, 1970, could be substituted for fusion welding.

Figure 3A:
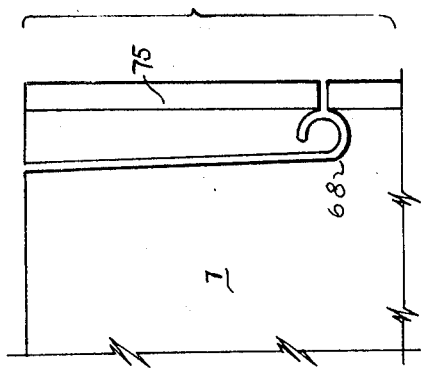
FIG. 3a is an enlarged fragmentary plan view of the coping cut taken on the right end of shape of FIG. 3.
Figure 3:
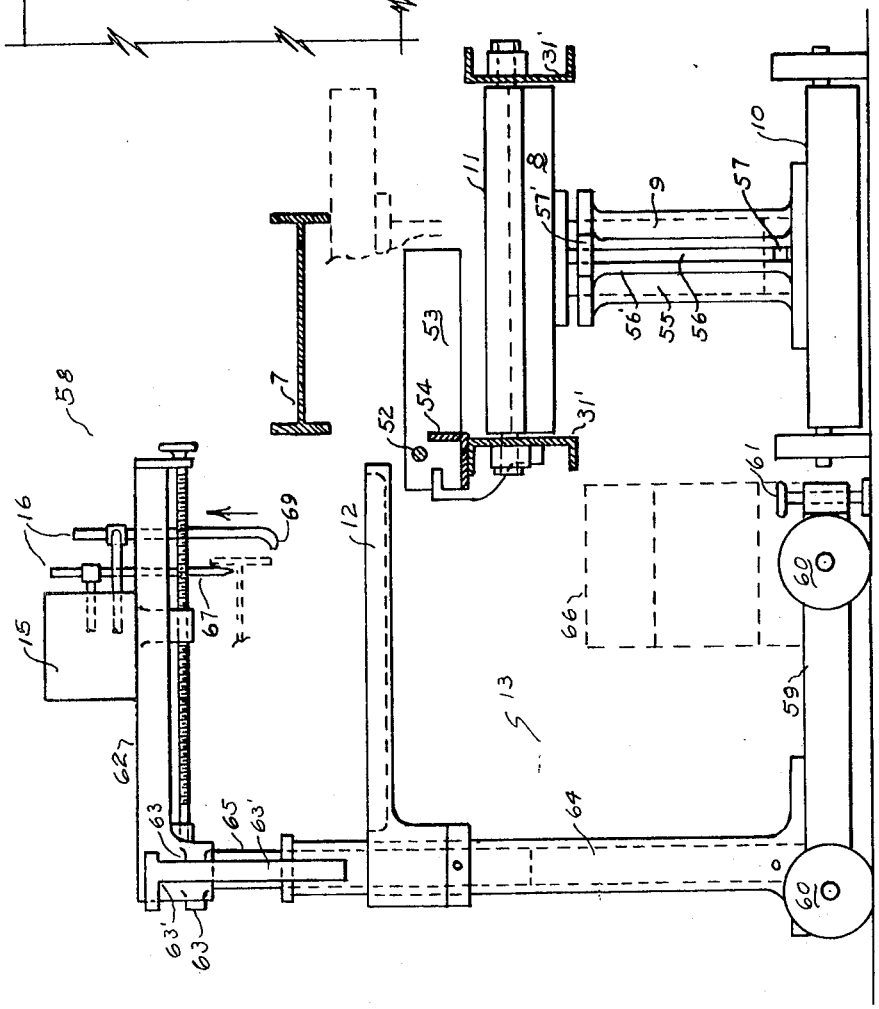
FIG. 3 is a cross-section taken on the left end of Station A of FIG. 1.

FIG. 3, a section taken near the end of station A, shows the longitudinal channels 31' supporting transverse shape-rollers 11, a screw 52 powered longitudinally-propelling shape-ram 53 keyed on a fixed shape-guiding fence 54, the cylinder 9—cushioned shape-lowering mechanism on portable truck 10, and the gas-burning coping mechanism 16.

In the lowering mechanism, the truck 10 has a flanged closed end pipe piston 55 with guiding rib 56 and limit stop 57 attached to the receiving block 8. The coping mechanism 58 is base 59—mounted on wheels 60 with swiveling back wheels and leveling screws 61 at the four corners. The slag pan 12 and cutting-mechanism table 62 swivels 90 degrees against stops 63. The hydraulic base-mounted cylinder 64 lowers or raises the piston 65 attached to the table, to bring it into correct cutting position over the shape against the combined limit stops at 63. The operators platform is shown in outline at 66.

In operation, the truck is carefully positioned levelled and adjusted in relation to the first shape. For all the succeeding shapes the pan and the table are then rotated successively into place or out of the working area to lower the shape. The straight torch 67 makes a reverse J shaped cut 68 through the web, as the hooked torch 69 simultaneously cuts up the height of the flange through the curved foot, to sever a piece of the flange 75 with a narrow attached portion of the web as shown in FIG. 3A.

FIG. 4 shows the channel 31 supporting standard 70, and the channel 71 supported end of the transverse conveyor belt 21 on a combined fixed base 72, that also supports the cleaning unit 17. The shape, resting on the transverse rollers, is moved over an outrigger 73 onto the conveyor belt by the moveable fence 19, projected by a threaded or racked rod 74 driven by a powered gear box 20.

FIG. 5 is generally an opposite-hand view of FIG. 4, with details of the drill press and the shape movement described under FIG. 1.

What I claim as new and desire to protect by Letters Patent of the United States is:

1. An integrated co-ordinated process for the complete mechanized preparation of structural steel floor and roof beam and girder units comprising in combination the following steps:

the pre-location of plural powered operating and fabricating units to required locations and dimensions for simultaneous execution of all required fabricating operations, the unloading, hoisting and transfer of raw shapes from an incoming vehicle onto a longitudinally-propulsive mechanism, the execution of shape-coping, cutting and welding operations thereon, the longitudinal propulsion of the shape through a powered cleaning vacuum apparatus for the complete removal and disposal of mill scale, rust and foreign matter, the arresting and locating of the shape on a similar longitudinal mechanism, the transverse transfer of the said shape to pre-located transversely operable dual belts, which locate the said shape in the operating area of end and intermediately located hole-piercing units, where the web and flanges are pierced near the ends, and the flanges are pierced at any points on the length, after length-centering of the said shape, progression to the assembling-fastening station where double-end connection angles are applied and secured to the web at the beam ends, progression and transfer to a longitudinally-propulsive mechanism where the web of the said shape is pierced at selected intermediate points, longitudinal propulsion through a painting-drying mechanism onto a similar propulsive mechanism, from which the completed member unit is hoisted and deposited in an outbound vehicle, said process being performed in a single continuing handling and fabricating operation.

2. An integrated co-ordinated process for the complete mechanized preparation, fabrication and finishing of structural steel floor and roof beam and girder members comprising in combination the following steps:

pre-location of plural powered operating and fabricating units to required locations and dimensions, for simultaneous execution of all required fabricating operations, placement of a raw shape on a longitudinally-propulsive mechanism, longitudinal propulsion of the shape through a powered cleaning-collecting means for removal of foreign matter, arresting and locating of the shape on a second longitudinal mechanism, transverse transfer of the shape to pre-located transversely operable dual belts, transverse forwarding of the shape into the operating area of the co-ordinated longitudinally-arranged said plural fabricating units, transverse locating and length-centering of the shape in and between the said plural fabricating units, excution of required plural fabricating operations, transverse forwarding of shape to a third longitudinally propulsive mechanism, longitudinal propulsion of shape through a painting-drying means onto a fourth longitudinal mechanism, and from which the completed member is removed, said process being performed in a single continuing handling and fabricating operation.

3. An integrated co-ordinated process for the complete mechanized preparation, fabrication and finishing of structural steel floor and roof beam and girder units comprising in combination the following steps:

pre-location of plural powered operating and fabricating units to require dimensions, for simultaneous execution of all required fabricating operations, unloading, hoisting and transfer of raw shape from an inbound vehicle onto a longitudinally-propulsive mechanism, longitudinal propulsion of the shape through a powered cleaning-vacuum apparatus for removal of foreign matter, arresting and locating of the shape on a second longitudinal mechanism, transverse transfer of the shape to pre-located transversely-operable dual belts, transverse forwarding of the shape into the operating area of co-ordinated longitudinally-arranged said plural fabricating units, transverse locating and length-centering of the shape in and between the said plural fabricating units, execution of required plural fabricating operations, transverse forwarding of shape to a third longitudinally propulsive mechanism, longitudinal propulsion of shape through a painting-drying means onto a fourth longitudinal mechanism, and from which the completed member is hoisted and deposited in an outbound vehicle, said process being performed in a single continuing handling and fabricating operation.

References Cited

UNITED STATES PATENTS

| | | | |
|---|---|---|---|
| 3,362,056 | 1/1968 | Preller et al. | 29—155 |
| 3,443,303 | 5/1969 | Groat | 29—430 |

THOMAS H. EAGER, Primary Examiner

U.S. Cl. X.R.

29—200 A, 430, 469